Sept. 15, 1959     G. H. INMAN     2,903,734
SANITARY HANDLE DEVICE
Filed Feb. 4, 1958
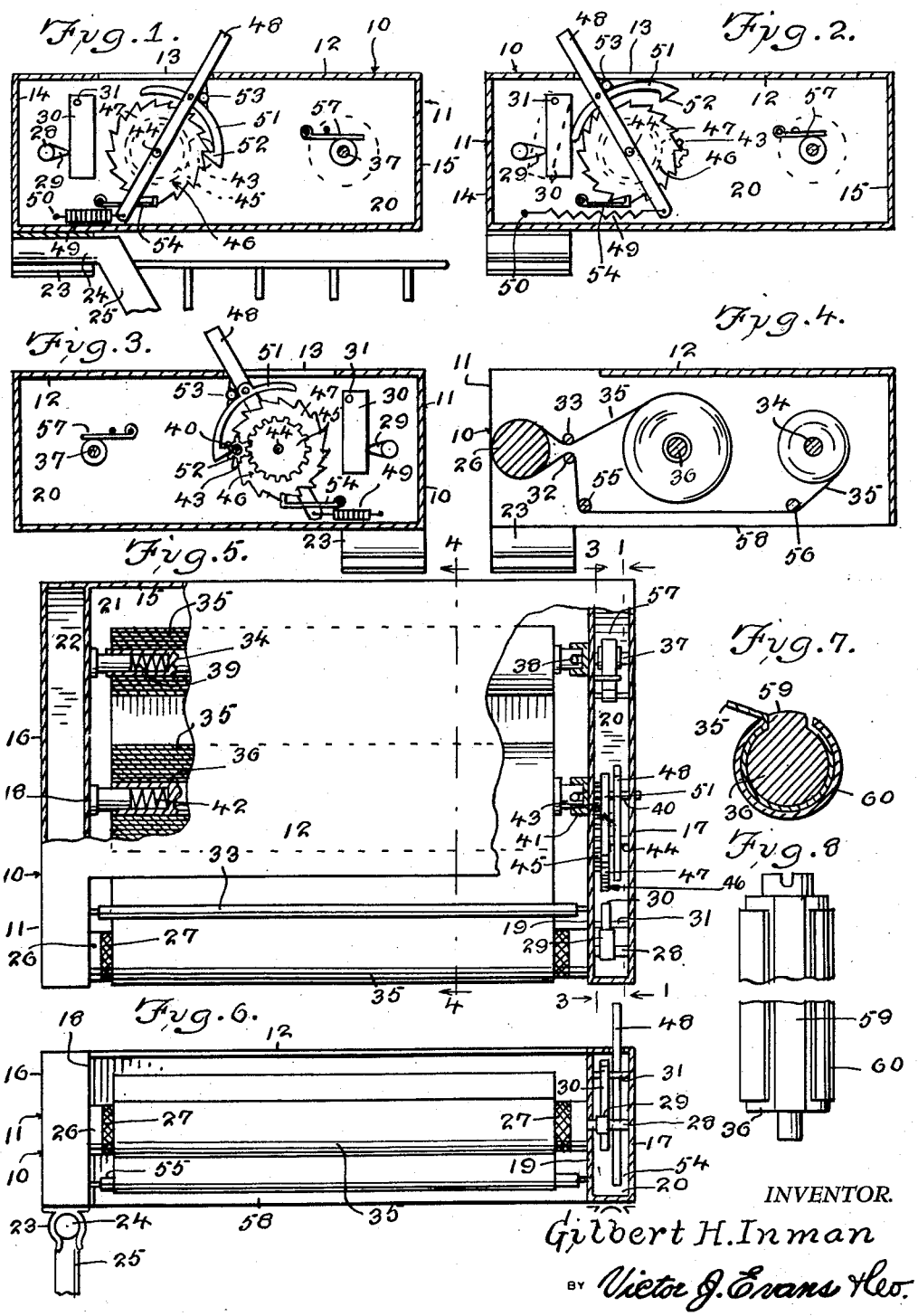
INVENTOR.
Gilbert H. Inman
BY Victor J. Evans & Co.
ATTORNEYS United States Patent Office 2,903,734
Patented Sept. 15, 1959

2,903,734

SANITARY HANDLE DEVICE

Gilbert H. Inman, Falmouth, Mass.

Application February 4, 1958, Serial No. 713,218

2 Claims. (Cl. 16—111)

This invention relates to a cart or carriage for use in transporting or handling packages or parcels in a store or the like and more particularly to a sanitary handle assembly for such a cart or carriage.

The object of the invention is to provide a sanitary handle device wherein there is provided a means for dispensing clean or fresh paper over a handle so that such a handle will be kept in a clean and sanitary condition.

Another object of the invention is to provide a sanitary handle device which is in the nature of a housing or casing that is detachably connected to a conventional cart which is used for transporting or moving parcels in a store such as a chain store, and wherein the handle device of the present invention includes a means for wrapping clean or fresh paper around the handle so that the user of the cart will be able to push the cart while gripping a clean handle member so that the possibility of the user of the cart picking up germs from a dirty or unsanitary handle, is eliminated, and wherein the user of the cart will not grip a dirty handle or the like.

A further object of the invention is to provide a sanitary handle device which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a vertical sectional view taken through the sanitary handle device of the present invention and showing the device attached to a portion of a conventional cart, and taken on the line 1—1 of Figure 5.

Figure 2 is a view similar to Figure 1, but showing the parts in shifted or adjusted position.

Figure 3 is a sectional view taken on the line 3—3 of Figure 5.

Figure 4 is a sectional view taken on the line 4—4 of Figure 5.

Figure 5 is a top plan view of the device, with parts broken away and in section.

Figure 6 is a front elevational view of the device, with parts broken away and in section.

Figure 7 is a sectional view illustrating the method of holding the old paper onto the old paper roller.

Figure 8 is a top plan view of the device shown in Figure 7.

Referring in detail to the drawings, the numeral 10 indicates the sanitary handle device of the present invention, and the device 10 includes a hollow housing or casing which is indicated generally by the numeral 11. The housing 11 comprises a horizontally disposed top wall 12 which is provided with a slot 13 therein, Figures 1 and 2. The housing 11 further includes spaced parallel vertically disposed end walls 14 and 15, and spaced parallel vertically disposed side walls 16 and 17. A pair of vertically disposed spaced parallel partitions 18 and 19 are arranged in the housing 11, and these partitions 18 and 19 define a first compartment 20, an intermediate chamber 21, and a second compartment 22, Figure 5.

A means is provided for detachably connecting the sanitary handle device 10 to a conventional cart 25, and this means comprises a pair of depending spring clips 23 which are adapted to engage frame bars 24 of the cart 25, as for example as shown in Figure 1.

Rotatably supported in the housing 11 is a cylindrical handle 26 which is provided with an outer roughened surface 27. A trunnion 28 is connected to an end of the handle 26, and the trunnion 28 has a cam 29 thereon. The cam 29 is adapted to engage a pivotally supported balance plate 30 which is pivotally supported by means of a pin 31. The numerals 32 and 33 indicate a pair of cylindrical guide members which are arranged contiguous to the handle 26, Figure 4.

Rotatably supported in the chamber 21 is a first roller 34 that has fresh paper 35 thereon. The numeral 36 indicates a second roller which is spaced from the first roller 34, and the second roller 36 is adapted to receive old or used paper thereon. A driven shaft 37 is connected to an end of the roller 34 through the medium of a clutch 38, and a spring pressed bearing 39 engages the other end of the roller 34. A drive shaft 40 is connected to the second roller 36 through the medium of a clutch 41, and a spring pressed bearing 42 engages an end of the roller 36. A gear member 43 is arranged on the shaft 40, and there is further provided a drive shaft 44 which has a gear wheel 45 thereon, and the gear wheel 45 meshes with the gear member 43. The numeral 46 indicates a toothed wheel which is also mounted on the shaft 44, and the wheel 46 includes a plurality of peripherally arranged teeth 47. The numeral 48 indicates a hand lever which is connected to the shaft 44, and the lever 48 extends through the slot 13 in the top wall 12. The coil spring 49 has one end connected to the lower end of the lever 48, while the other end of the coil spring 49 is anchored in place as at 50.

As shown in the drawings, a curved arm 51 is connected to the lever 48, and the arm 51 carries a pointed dog 52 which is adapted to engage the teeth 47 of the wheel 46, and a spring member 53 engages the arm 51. The other end of the arm 51 is adapted to be engaged by the balance plate 29.

Arranged in engagement with the toothed wheel 46 is a pawl 54, and the numerals 55 and 56 indicate a pair of guide rods which are supported in the housing. The numeral 57 indicates a brake for the roller 34, and as shown in Figure 4 for example, the major portion of the bottom of the housing 11 is open as at 58 so that old paper can be readily removed, and wherein new paper can be readily installed in the device. The brake device 57 consists of a spring member which exerts friction on a roller to hold it in place, and the roller is on the shaft 37 so that the spring member functions as a conventional brake.

A means is provided for clamping the paper onto the roller 36, and this means is shown in detail in Figures 7 and 8. Thus, it will be seen that the roller 36 is provided with an elongated shoulder 59, and the numeral 60 indicates a split clamping tube, whereby the tube 60 can be arranged over the roller 36 for clamping paper on the roller 36. From the foregoing, it is apparent that there has been provided a sanitary handle device which is especially suitable for use on shopping carts such as those carts which are used in chain stores. In use, the sanitary handle device 10 of the present invention is adapted to be connected to the frame bars 24 of the shopping cart 25, by means of the spring clips 23. The spring clips 23 are constructed so that the device can be readily removed from the shopping cart 25 when desired. With the device attached to the shopping cart 25, and with the paper 35 arranged as previously described as shown in Figure 4 for example, it will be seen that when the lady or other person wishes to push the cart as when groceries are being picked up or purchased, it is only necessary to grip the handle 26. The device is constructed so that the paper 35 covers the handle 26 whereby the user of the cart will have a clean and sanitary surface to grip. When the next person uses the cart, a clean section of paper 35 is moved into position around the roller 26 so that each successive user of the device grips clean paper.

The paper on the roller 34 is fresh or clean or new paper. The bottom portion 58 of the housing 10 is open so that when the paper has all been used up, then the roller 34 can be moved from right to left in Figure 6 so as to compress the spring assembly 39 whereby the right end of the roller 34 can be disengaged at the clutch 38 so that a new roller 34 can be mounted in the housing, and such a new roller will have fresh paper thereon. This paper is then trained under the guide rods 56 and 55, and the paper is then extended between the guide members 33 and 32, Figure 4, and the paper is wrapped around the handle 26 and then passed through the space between the guide members 33 and 32, and this paper is then fastened to the roller 36 by means of the sleeve or tube 60. Thus, the roller 36 has the shoulder 59 so that the split tube 60 holds the paper in place on the roller 36.

When a new section of paper is to be arranged over the handle 26 it is only necessary to manually move actually the lever 48 so that for example the lever 48 can be moved from the position shown in Figure 1 to the position shown in Figure 2 by gripping the upper end thereof. The lever 48 moves through the slot 13 in the top wall 12 of the housing 11 and as the lever 48 moves, it moves the arm 51 which causes the dog 52 to engage a tooth 47 on the wheel 46 whereby the wheel 46 is rotated so that as the wheel 46 is rotated, the shaft 44 will turn. This rotation of the shaft 44 causes rotation of the gear 45, and since the gear 45 meshes with the gear 43, and since the gear 43 is on the shaft 40, it will be seen that this movement of the lever 48 will result in rotation of the shaft 40. The shaft 40 is coupled to the roller 36 by means of the clutch 41, whereby rotation of the shaft 40 causes similar rotation of the roller 36. Thus, the roller 36 constitutes a power roller which serves to wind up a quantity of used paper thereon and as this used paper is pulled from the handle 26 a new section or supply of fresh paper is automatically pulled from the first roller 34 and arranged in position on the handle 26. The handle 26 is knurled or roughened as at 27 so as to provide a rough surface which facilitates the movement of the paper due to increased frictional contact. The roller 36 is releasably supported in the housing by means of the spring bearing assembly 42, and this construction permits the roller 36 to be readily disconnected and removed from the bottom of the housing, as for example, when the roller 36 becomes filled with soiled paper. When the parts reach their furthermost position as shown in Figure 2, it will be seen that the cam 29 will engage the balance plate 30 which will engage the end of the arm 51 whereby the dog 52 will be pivoted to an out-of-the-way position so that when pressure is released on the lever 48, the spring 49 serves as a return spring whereby the parts are returned automatically from the position shown in Figure 2 to the starting position shown in Figure 1 so that the cycle of operations can be readily repeated each time a fresh quantity of paper is to be extended over the handle 26. The brake 57 can be used for controlling rotation of the roller 34 so as to prevent such roller from turning too fast. The spring clips 23 permit the entire device 10 to be disconnected or disengaged from the shopping cart 25, so that the device can be conveniently turned upside-down if desired whereby rollers such as the rollers 34 and 36 can be readily removed and replaced as desired.

In Figures 7 and 8 there is illustrated a method of fastening the paper to the roller 36, and when the rollers are being changed or removed, the device is removed from the cart and turned upside-down and the rollers can be moved so as to compress the spring assemblies 39 or 42 so that the rollers can then be removed and when new rollers are being put in, the reverse procedure is followed. The rollers may be supported by wing nut assemblies if desired so as to provide a releasable support for the rollers.

The sanitary handle device of the present invention is especially suitable for use on chain store parcel carriages which are pushed around by customers as the various items are selected. It is well known that the handles of such carriages are engaged by many different persons and for that reason it is important that the handles be kept sanitary and clean. For example, sweaty hands leave germs on a handle in certain instances and sometimes such handles become sticky from use. Furthermore, sometimes children will push their mouths against the handles when parents are not looking, and with the present invention the handle will be kept in a sanitary condition and fresh papers can be arranged over the handle 26 by simply actuating the lever 48. Furthermore, the sanitary handle device of the present invention can be readily connected to or disconnected from a conventional cart, and if desired, it can be installed at the factory or the like.

The cart which uses the sanitary handle device is of conventional construction. The pawl 54 prevents the parts such as the toothed wheel 46 from reversing its direction. The cam 29 is connected to the trunnion 28 which in turn is connected to the handle 26 so that for each rotation of the handle 26, the cam 29 will engage the balance plate 30 which in turn will strike the end of the arm 51 whereby the dog 52 will be disengaged from the ratchet or wheel 46 so as control the amount of paper going onto the handle.

As the lever 48 is pulled, the wheel or ratchet 46 turns which in turn rotates the shaft 40 through the intermeshing gears 45 and 43 and this serves to turn the roller 36 which pulls the paper over the handle 26 until the cam 29 comes around and contacts the balance weight or plate 30 which releases the dog 52 from the wheel 46, and then the spring 49 will return the lever 48 and its associated parts to starting position. The roughened surface 27 insures that the paper will cling to the roller as the roller rotates. Suitable bearings can be provided for the rotating parts wherever desired or required. The parts can be made of any suitable material and in different shapes or sizes. The used paper roller 36 is empty at the beginning and this roller fills up as the device is used. The various guide members such as the guide members 33, 32, and 55 and 56 serve to guide the paper in its proper direction, and the guide members 33 and 32 maintain the paper snugly on the handle 26. Suitable bolt and nut assemblies can be used to provide a detachable support for the rollers if desired. The material 35 may be made of a suitable material such as paper, and is preferably water repellent and as thin as practical, so that will provide an efficient covering for the handle.

The above description of the invention is for illustrative purposes only and it is understood that modifications may be made in the construction within the scope and spirit of the following claims.

I claim:

1. In a device of the character described, a hollow housing including a horizontally disposed top wall, spaced parallel vertically disposed side walls, and spaced parallel vertically disposed end walls, a pair of vertically disposed spaced parallel partitions arranged in said housing and defining an intermediate chamber and spaced apart first and second compartments, a cylindrical handle rotatably supported in said chamber and having an outer roughened surface, a trunnion extending from one end of said handle, a cam connected to said trunnion, a balance plate pivotally supported in said first compartment and adapted to be engaged by said cam, a pair of cylindrical guide members arranged contiguous to said handle, a first roller rotatably supported in said chamber for holding fresh paper thereon, a second roller spaced from said first roller and said second roller adapted to receive the used paper thereon, a driven shaft arranged contiguous to an end of the second roller, a gear member on said driven shaft, a drive shaft spaced from said driven shaft, a gear wheel on said drive shaft meshing with said gear member, a wheel connected to said drive shaft and said wheel having a plurality of peripherally spaced teeth thereon, a lever connected to said drive shaft, a coil spring connected to the lower end of said lever, a curved arm connected to said lever and said arm having a dog on one end thereof for engagement with the teeth on said wheel, the other end of said arm adapted to selectively engage said balance plate, a pawl arranged in engagement with the wheel, a pair of spaced parallel guide rods arranged in said compartment, the paper from the first roller being trained under said guide rods and through the guide members and over the handle and engaging the second roller.

2. The structure as defined in claim 1 and further including a pair of spaced apart spring clips depending from said housing for engagement with a parcel carriage.

References Cited in the file of this patent

UNITED STATES PATENTS

| | | |
|---|---|---|
| 1,788,949 | Grunwald | Jan. 13, 1931 |
| 2,045,249 | Petersen | June 23, 1936 |
| 2,123,469 | Joriot | July 12, 1938 |
| 2,622,873 | Wenneche | Dec. 23, 1952 |
| 2,687,589 | Brockway | Aug. 31, 1954 |
| 2,803,849 | Peters | Aug. 27, 1957 |